United States Patent
Agalgave

(10) Patent No.: US 9,190,064 B2
(45) Date of Patent: Nov. 17, 2015

(54) RESOLUTION-INDEPENDENT DITHER SAMPLE INSERTION FOR AUDIO TRANSMISSIONS

(71) Applicant: Broadcom Corporation, Irvine, CA (US)

(72) Inventor: Umesh Mallappa Agalgave, Sangli (IN)

(73) Assignee: Broadcom Corporation, Irvine, CA (US)

(*) Notice: Subject to any disclaimer, the term of this patent is extended or adjusted under 35 U.S.C. 154(b) by 293 days.

(21) Appl. No.: 14/026,756

(22) Filed: Sep. 13, 2013

(65) Prior Publication Data

US 2015/0066517 A1 Mar. 5, 2015

Related U.S. Application Data

(60) Provisional application No. 61/872,696, filed on Aug. 31, 2013.

(51) Int. Cl.
*H04M 11/06* (2006.01)
*G10L 19/00* (2013.01)

(52) U.S. Cl.
CPC ............... *G10L 19/00* (2013.01); *H04M 11/06* (2013.01)

(58) Field of Classification Search
CPC .................................................... H04M 11/06
USPC ........................................................ 704/500
See application file for complete search history.

(56) References Cited

U.S. PATENT DOCUMENTS

| 3,962,640 | A | * | 6/1976 | Bomba | H03J 5/0245 334/11 |
|---|---|---|---|---|---|
| 5,311,180 | A | * | 5/1994 | Borgen | H03M 1/0641 341/110 |
| 5,448,237 | A | * | 9/1995 | Borgen | H03M 1/0641 341/101 |
| 5,766,205 | A | * | 6/1998 | Zvenyatsky | A61B 17/0218 600/564 |
| 7,570,182 | B2 | * | 8/2009 | Sheba | G04F 10/005 341/118 |
| 8,570,924 | B2 | * | 10/2013 | Gerstenberger | H04W 52/0219 370/311 |
| 8,571,091 | B2 | * | 10/2013 | Dalsgaard | H04W 76/005 370/278 |

* cited by examiner

Primary Examiner — Susan McFadden
(74) Attorney, Agent, or Firm — Fiala & Weaver P.L.L.C.

(57) ABSTRACT

Methods, systems, and apparatuses are provided for resolution-independent dither sample insertion for audio transmissions. Audio transmitters transmit audio data streams to audio receivers. Data inactivity in the data stream triggers the audio receivers to enter power-saving/sleep modes in which synchronization with the audio transmitters is lost thus requiring time consuming resynchronization. Inactivity such as silence or zero-value data is detected in a data stream. Upon detection, a dither sample is inserted into the data stream and transmitted to the audio receiver to prevent the loss of synchronization. The dither sample may have a negative value and be formatted for resolution-independence with respect to the audio receiver.

20 Claims, 5 Drawing Sheets

RESOLUTION-INDEPENDENT DITHER SAMPLE INSERTION FOR AUDIO TRANSMISSIONS

CROSS-REFERENCE TO RELATED APPLICATIONS

This application claims priority to U.S. Provisional Patent Application No. 61/872,696, filed Aug. 31, 2013, and entitled "Resolution-Independent Dither Sample Insertion for Audio Transmissions," the entirety of which is incorporated by reference herein.

BACKGROUND

1. Technical Field

The subject matter described herein relates to systems, apparatuses, and methods for inserting dither samples that are independent of data resolution into audio signals and transmissions.

2. Background Art

Data transmission on audio channels occurs between audio transmitters and audio receivers. Audio transmitters, such as set-top boxes (e.g., cable/satellite set-top boxes), provide audio signals to audio receivers, such as televisions and/or other home theater devices. In order to save power, audio receivers typically enter a power saving mode when no data (i.e., silence or an inactive data stream) is transmitted the audio transmitters. The audio receivers resume a normal mode of operation when data resumes in the received data stream (i.e., sound or an active data stream). However, audio receivers may become unsynchronized with audio transmitters during the power saving mode. For instance, during a power saving mode, audio receivers may stop tracking the clock signal provided with the audio data from the audio transmitter. When an audio receiver fails to track the clock, synchronization with an audio transmitter may be lost, and when the audio receiver comes out of its power saving mode, the transmitter clock must be re-acquired by the audio receiver to recapture synchronization. The process of re-acquiring synchronization often results in unpleasing noise such as pops, clicks, and/or static at the audio receiver. Additionally, re-acquiring synchronization requires additional delay and consumption of processor cycles.

In the current state of the art, a dither sample is provided to an audio receiver from an audio transmitter during periods in which only silence is transmitted to the audio receiver. In prior solutions, a dither sample usually is a data value that is the smallest possible positive data value that may be transmitted to an audio receiver so that resulting audio that is broadcast based on the dither sample is of a low amplitude. Typically, data is transmitted from audio transmitters in a 1's complement or 2's complement format, and therefore, dither samples typically have a value of '1' (usually in hexadecimal representation) regardless of the bit resolution of the transmission. For example, a 16-bit resolution dither sample with value '1' is 0001h, and a 24-bit resolution dither sample with value '1' is 000001h. However, when the audio transmitter has a higher bit resolution than the audio receiver, such a dither sample may not be received by the audio receiver. For instance, a 24-bit audio transmitter may provide audio data to a 20-bit or 16-bit audio receiver. In these cases, the audio transmitter provides 24-bit dither samples of 000001h, but because of their lower bit resolutions, 20-bit and 16-bit audio receivers truncate the dither samples (one or more right-most bits are lost). In a 20-bit resolution audio receiver, a 24-bit dither sample of 000001h is received as 00000h, and in a 16-bit resolution audio receiver, a 24-bit dither sample of 000001h is received as 0000h. Consequently, the dither sample is not received in these cases, and the 20-bit and 16-bit audio receivers effectively receive silence (no data or inactive data streams) and go into power saving modes where synchronization is lost.

Similarly, a 24-bit audio receiver may receive audio data from a 20-bit or 16-bit audio transmitter. A dither value of '0001h' (16-bit) or a dither value of '00001h' (20-bit) will be received as higher amplitude values by the 24-bit audio receiver: '000100h' and '000010h' respectively.

BRIEF SUMMARY

Methods, systems, and apparatuses are described for inserting dither samples that are independent of data resolution into audio signals, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

1. Introduction

Figure 1A:
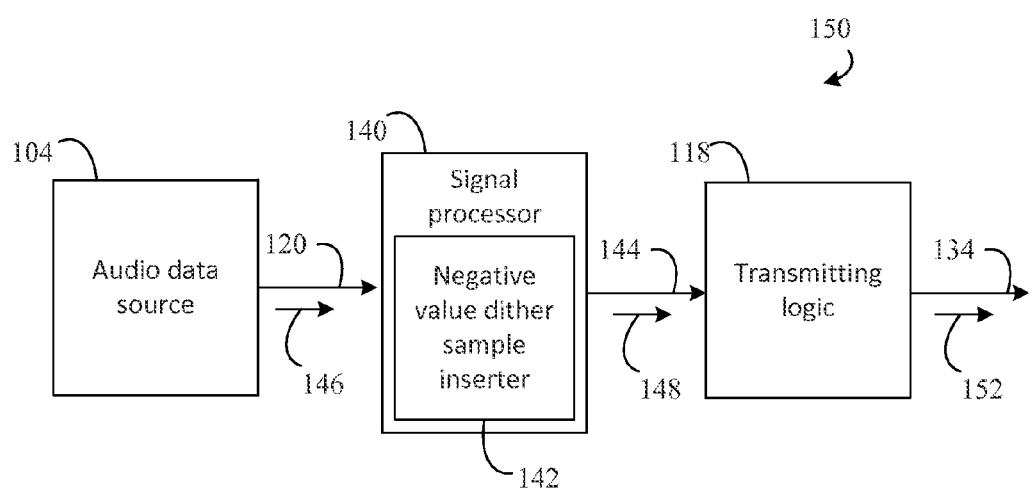
FIG. 1A is a block diagram representation of an example audio data transmission system configured to transmit a data stream with negative value dither samples during periods of data indicating silence, according to an exemplary embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. The embodiments described herein may be used separately or in conjunction with one another in any combination and are not to be considered mutually exclusive.

Further, terminology used herein such as "about," "approximately," and "substantially" have equivalent meanings and may be used interchangeably.

Still further, numbers denoted with an 'h' suffix indicate that the numbers are in hexadecimal format.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner 2. Example Embodiments The examples described herein may be adapted to various types of electronic devices such as wired and wireless communications systems, computing systems, communication devices, televisions and/or interactive television technologies, set-top boxes (cable/satellite boxes), television programming devices, home entertainment and/or theater devices, mobile devices, and/or the like. In embodiments, data streams such as audio data streams that originate at an audio source, may be transmitted from audio transmitters to audio receivers. One or more components of the audio transmitters, or devices which include the audio transmitters, may process the data streams to insert dither samples. Furthermore, additional structural and operational embodiments, including modifications/alterations, will become apparent to persons skilled in the relevant art(s) from the teachings herein.

In embodiments, audio transmitters may communicate with audio receivers (e.g., via a data stream) using any known communication standard, such as Sony/Philips Digital Interconnect Format (S/PDIF) and High-Definition Multimedia Interface (HDMI), as well as any audio channel format using encoded channel transitions such as return-to-zero (RZ) and non-return-to-zero (NRZ) encodings. The techniques described herein allow for the transmitted data stream to include silence or zero-value data that conventionally may cause an audio receiver to enter a power saving mode by inserting dither samples. The techniques described herein overcome the deficiencies of the state of the art by allowing for the insertion of dither samples with negative values into the data stream. An inserted dither sample prevents the audio receiver from entering a power saving mode. Furthermore, by using negative valued dither samples, reductions in the bit resolution of the data stream will not cause the dither samples to be lost.

Various embodiments presented herein allow for the insertion of dither samples into data streams which are independent of the bit-resolution of the data stream. For instance, a dither sample with a value of '−1h' in two's complement format with 24-bit resolution (i.e., 'FFFFFFh') may be received properly by an audio receiver irrespective of the bit resolution of the receiver. For example, such a dither sample transmitted to an audio receiver with 16-bit resolution is received as 'FFFFh' which is '−1'. Similarly, such a dither sample transmitted to an audio receiver with 20-bit resolution is received as 'FFFFFh' which is '−1'. As the least significant bits are truncated by an audio receiver with lower bit resolution than the transmitter, the correct dither sample is nonetheless received. Likewise, a one's complement format is similarly effective.

It should be noted that in embodiments, the audio transmitter may have a bit resolution that is greater than, or greater than or equal to, the bit resolution of the audio receiver.

With the techniques described herein, including but not limited to, monitoring a data stream for inactivity, generating a dither sample with a negative value, and inserting the dither sample into the data stream, the need for resynchronization between audio transmitters and audio receivers may be substantially reduced or eliminated, thus reducing time spent during re-synchronization and reducing or eliminating undesirable noise that occurs during resynchronization.

In an example aspect, a method is disclosed. The example method includes monitoring a data stream provided to transmitting logic. The method also includes determining that the monitored data stream indicates inactivity. The method further includes transmitting a dither sample by the transmitting logic in response to said determining that the monitored data stream indicates inactivity, the dither sample comprising a negative value.

In another example aspect, an apparatus is disclosed that includes a signal processor and transmitting logic. The signal processor is configured to receive a data stream from an audio data source and process the data stream. The signal processor includes monitoring logic and dither sample generation logic. The monitoring logic is configured to determine whether the data stream indicates activity or inactivity. The dither sample generation logic is configured to generate a dither sample for insertion into the data stream in response to determining that the data stream indicates inactivity, where the dither sample comprises a negative value. The transmitting logic is configured to transmit the processed data stream from the apparatus.

In yet another example aspect, a system is disclosed that includes an audio data source, monitoring logic, and dither sample generation logic. The audio data source is configured to provide a data stream. The monitoring logic is configured to determine whether the provided data stream indicates activity or inactivity. The dither sample generation logic is configured to generate a dither sample for insertion into the data stream in response to determining that the data stream indicates inactivity, where the dither sample comprises a negative value.

Various example embodiments are described in the following sections. In particular, example dither sample insertion logic embodiments are described, followed by further example embodiments and advantages. Descriptions of these embodiments are followed by descriptions of example operational embodiments, and example computer-implemented embodiments.

3. Example Dither Sample Insertion Logic Embodiments

A dither sample may be selected and inserted into an audio signal in various ways, according to the embodiments herein. For example, FIG. 1A is a block diagram representation of an audio data transmission system 150 configured to transmit a data stream with negative value dither samples during periods of data indicating silence, according to an exemplary embodiment. As shown in FIG. 1A, system 150 includes an audio data source 104, transmitting logic 118, and a signal processor 140. Furthermore, signal processor 140 includes negative value dither sample inserter 142. These features of system 150 are described as follows.

Audio data source 104 may be configured to provide a data stream 146 to transmitting logic 118 via one or more lines 120. In embodiments, data stream 146 may be an audio data stream, such as in the form of an HDMI supported audio data stream (e.g., LPCM (linear pulse-code modulation), Dolby Digital, DTS, DVD-Audio, Super Audio CD (compact disc), Dolby Digital Plus, Dolby TrueHD, DTS-HD (DTS-high definition) High Resolution Audio, DTS-HD Master Audio, MPCM, DSD (direct stream digital), DST (direct stream transfer), etc.) or other audio format data stream. Data stream 146 may be transmitted according to various data resolutions such as, but without limitation, 16-bit resolution, 20-bit resolution, and/or 24-bit resolution, in which the number of data bits transmitted per data block or frame corresponds to the bit resolution. Audio data source 104 may provide data stream 146 as related to any number of applications, e.g., television, cable, satellite, and/or programming applications, digitally recorded content, multi-media streaming, and/or the like, according to embodiments.

As shown in FIG. 1A, signal processor 140 receives provided data stream 146 on line(s) 120. Signal processor 140 may be configured to perform any type of signal processing of data stream 146, including equalization, amplification, filtering, etc. Furthermore, negative value dither sample inserter 142 is configured to determine whether data stream 146 indicates activity or inactivity, and to generate a dither sample for insertion into data stream 146 in response to determining that data stream 146 indicates inactivity. As shown in FIG. 1A, signal processor 140 generates processed data stream 148, which is provided on one or more line(s) 144. Processed data stream 148 includes data of data stream 146 that is optionally modified by signal processor 140 (e.g., due to filtering, amplification, equalization, etc.), and may include one or more negative valued dither samples inserted therein during one or more detected periods of inactivity. When inserting a dither sample, negative value dither sample inserter 142 may replace a data value received in data stream 146 that indicates inactivity (e.g., a zero value data) with the dither sample to generate processed data stream 148. In embodiments, a dither sample generated by negative value dither sample inserter 142 has a negative value. As such, the dither sample negative value is not lost if the bit resolution of processed data stream 146 is subsequently reduced, and the processed data stream 148 does not produce noise when the dither sample is broadcast.

As shown in FIG. 1A, transmitting logic 118 receives processed data stream 148 on line(s) 144. Transmitting logic 118 is configured to transmit processed data stream 148 as transmitted data stream 152 on one or more line(s) 134. In embodiments, transmitting logic 118 may transmit processed data stream 152 to a receiver, such as, but without limitation a television, a computer or computing device, a home theater device, and/or the like. As described herein, the processed data stream may be transmitted by transmitting logic 118 at one or more bit resolutions (e.g., 16-bit, 20-bit, 24-bit, etc.) and in a one's complement or a two's complement format. In some embodiments, transmitting logic 118 may transmit transmitted data stream 134 wirelessly or along a wired connection (i.e., line(s) 134). Note that line(s) 120, 144, and 134, and further lines disclosed herein, may each represent one or more wired (e.g., wires, conductors, traces, connections internal to an integrated circuit, etc.) and/or wireless connections.

Note that audio data transmission system 150 may be included in one or more devices. For instance, audio data source 104, signal processor 140, and transmitting logic 118 may be included in a same device, or audio data source 104 may be included in a first device and signal processor 140 and transmitting logic 118 may be included in a second device. Examples of such devices in which one or more of audio data source 104, signal processor 140, and transmitting logic 118 may be included include a storage device, a mobile or stationary computer or computing device (e.g., a personal digital assistant (PDA), a laptop computer, a notebook computer, a tablet computer such as an Apple iPad™, a netbook, a desktop computer, etc.), a mobile phone (e.g., a cell phone, a smart phone, etc.), a wearable computing device, a DVD (digital video disc) player, a cable set top box, a game console, a stereo receiver, a television, etc. In one example, audio data source 104 may be a storage device in a cable set top box, and signal processor 140 and transmitting logic 118 may be included in the same cable set top box, and may transmit data stream 152 to a display device (e.g., a television). In another example embodiment, audio data source 104 may be a media source device such as a DVD player (e.g., a Blu-ray player) and signal processor 140 and transmitting logic 118 may be included in a stereo receiver. Further implementations of audio data source 104, signal processor 140, and transmitting logic 118 in devices will be apparent to persons skilled in the relevant art(s) from the teachings herein.

Figure 1B:
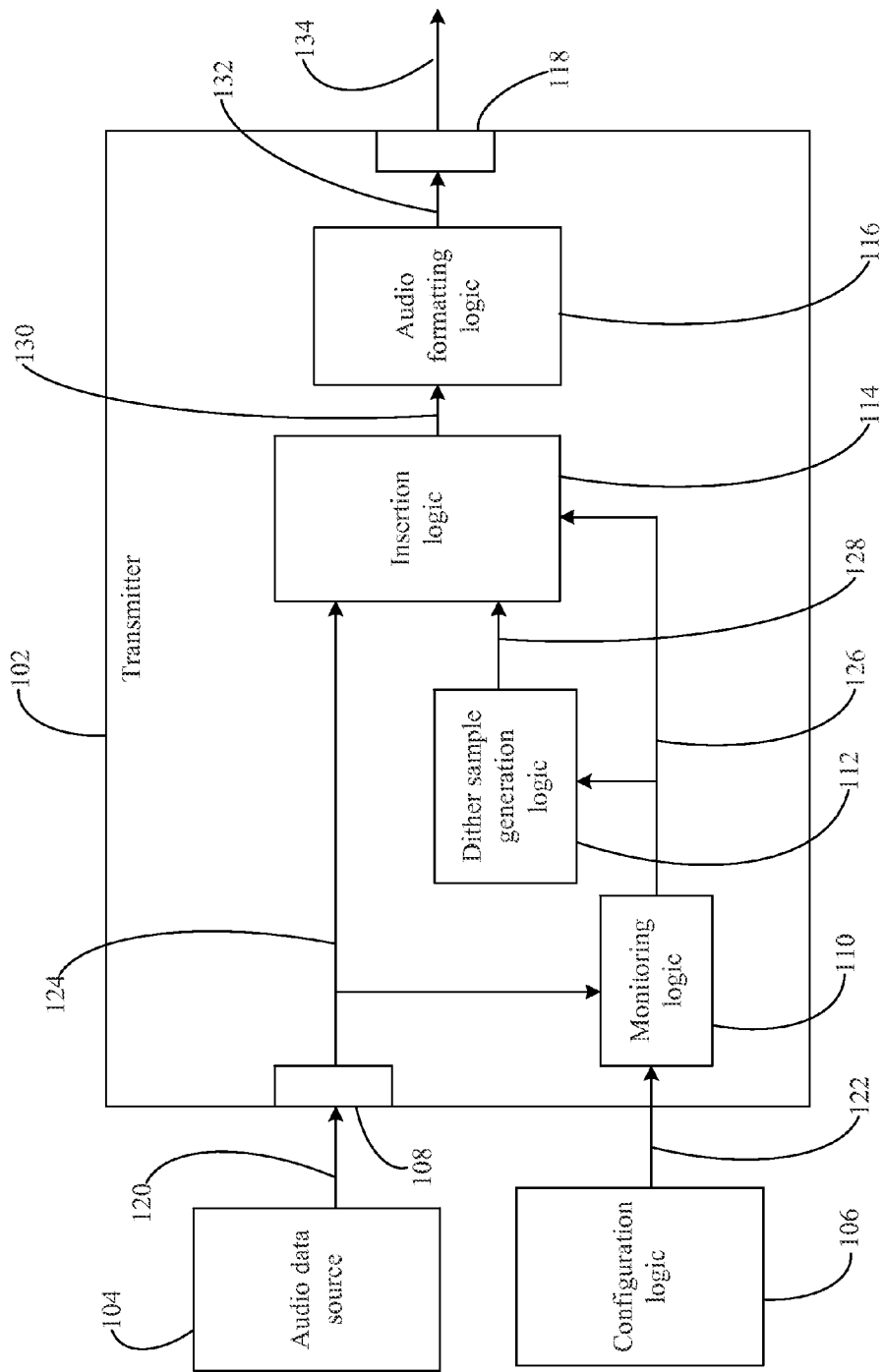
FIG. 1B is a block diagram representation of dither sample insertion logic configured to insert negative value dither samples during periods of data indicating silence, according to an exemplary embodiment.

Audio data transmission system 150 of FIG. 1A may be configured in various ways to insert dither samples in embodiments. For instance, FIG. 1B shows a block diagram of exemplary dither sample insertion logic 100, according to an embodiment. Dither sample insertion logic 100 is an example of dither sample insertion system 150 of FIG. 1A. Dither sample insertion logic 100 includes a transmitter 102, audio data source 104, and configuration logic 106. Transmitting logic 118 of FIG. 1A is included in transmitter 102 of FIG. 1B, and negative value dither sample inserter 142 of FIG. 1A is implemented in transmitter 102 of FIG. 1B as monitoring logic 110, dither sample generation logic 112, and insertion logic 114. Although signal processor 140 is not explicitly shown in FIG. 1B, transmitter 102 may optionally implement a signal processor to process data streams therein. Dither sample insertion logic 100 is configured to process a data stream including, but not limited to, monitoring the data stream, inserting a dither sample into the data stream, and formatting the data stream. Dither sample insertion logic 100 and each of the components included therein may include functionality and connectivity beyond what is shown in FIG. 1B, as would be apparent to persons skilled in relevant art(s). However, such additional functionality is not shown in FIG. 1B for the sake of brevity.

Audio data source 104 may be configured to provide a data stream (e.g., data stream 146 of FIG. 1A) to transmitter 102 via line(s) 120. In embodiments, the provided data stream may be an audio data stream that carries audio data according to a standard or format as described elsewhere herein or otherwise known. The provided data stream may be transmitted according to various data resolutions such as, but without limitation, 16-bit resolution, 20-bit resolution, and/or 24-bit resolution, in which the number of data bits transmitted per data block or frame corresponds to the bit resolution. Audio data source 104 may provide the data stream in any number of applications, such as television, cable, satellite, and/or programming applications, digitally recorded content, multi-media streaming, and/or the like, according to embodiments.

Configuration logic 106 may be configured to provide configuration information for the insertion of dither samples into a data stream (e.g., an audio data stream) to transmitter 102 via one or more lines 122. In embodiments, configuration logic 106 may provide configuration information relating to the data stream bit resolution, the number of data samples indicative of inactivity (e.g., a threshold of inactivity) desired before insertion of the dither sample, the value of the dither sample, the frequency of or number of frames between dither sample insertions, and/or the like. Based on the provided configuration information, subcomponents of dither sample insertion logic 100, as described below, may perform their functions. In embodiments, configuration logic 106 may be programmed in a ROM, RAM, or other memory/device, and/or may be dynamically programmable during operation.

Transmitter 102 as shown in FIG. 1B, includes an audio input circuit 108, monitoring logic 110, dither sample generation logic 112, insertion logic 114, audio formatting logic 116, and transmitting logic 118. It should be noted, however, that fewer or additional subcomponents of transmitter 102 may be included in alternate embodiments as would be understood by one of skill in the relevant art(s) having the benefit of this disclosure.

As shown in FIG. 1B, audio input circuit 108 is communicatively coupled to audio data source 104 via line(s) 120. As such, audio input circuit 108 receives the data stream from audio data source 104. Audio input circuit 108 provides data of the received data stream as an output to monitoring logic 110 and insertion logic 114 via one or more line(s) 124. Monitoring logic 110 is communicatively coupled to configuration logic 106 via one or more line(s) 122. Based on the data received on line(s) 122, monitoring logic 110 generates and provides one or more data values as outputs to dither sample generation logic 112 and insertion logic 114 via one or more lines 126. Based on the data value(s) received on line(s) 126, dither sample generation logic 112 provides a data value as an output to insertion logic 114 via one or more lines 128. Based on the data/data value(s) received on line(s) 124 and 128, insertion logic 114 provides data as an output to audio formatting logic 116 via one or more lines 130. Based on the data received on line(s) 130, audio formatting logic 116 provides data as an output to transmitting logic 118 via one or more lines 132. Transmitting logic 118 transmits the data received on line(s) 130 on one or more line(s) 134. It should be noted that fewer connections or additional connections not shown in FIG. 1B may be present in some embodiments.

Audio input circuit 108 may be configured to receive a data stream (e.g., data stream 146) from audio data source 104. In embodiments, the data stream may be an audio data stream as described herein. Audio input circuit 108 may include buffers and/or other components found in input/interface circuits commonly found in the state of the art. Audio input circuit 108 may comprise wired connections, input ports/connections, wireless connections and associated circuitry, integrated circuits, combinatorial logic, and/or the like.

Monitoring logic 110 may be configured to determine whether the data stream received in line(s) 124 indicates activity or inactivity. For instance, monitoring logic 110 may monitor the data stream via line(s) 124 to determine if no data is present in the data stream, or if the data stream is not transmitting data. Monitoring logic 110 may also or alternatively monitor the data stream via line(s) 124 to determine if one or more data values or samples in the data stream have a value of zero ("0") or are otherwise indicative of silence. The data stream may be monitored in accordance with data samples that are of a size corresponding to the bit resolution of the data stream. For example, a 24-bit data stream may be sampled 24 bits at a time to determine whether no data or zero-value data (e.g., '0h') is present in the data stream.

As noted above, configuration logic 106 may provide configuration information relating to the data stream bit resolution, the number of data samples indicative of inactivity desired before insertion of the dither sample, the value of the dither sample, and/or the like. As illustrated, such configuration information is provided to monitoring logic 110 via line(s) 122. In embodiments, monitoring logic 110 performs one or more functions in accordance with the provided configuration information. For example, monitoring logic 110 may receive data from configuration logic 106 that indicates the bit resolution of the data stream, how many samples of silence or zero-value data are to be observed before a dither sample is inserted into the data stream, how often to insert dither samples into the data stream, and/or what the value of the dither sample will be. In some embodiments, a single sample of silence or zero-value data may be used as a threshold that, when reached or exceeded, prompts monitoring logic 110 to signal dither sample generation logic 112 via line(s) 126 with data indicating that a dither sample of the configured value should be generated for insertion into the data stream. Alternatively, two or more data samples/values of zero value or otherwise indicating silence may be used as the threshold. Similarly, when the threshold value of samples is reached, monitoring logic 110 may signal insertion logic 114 via line(s) 126 with data indicating that dither sample generated by dither sample generation logic 112 and received on line(s) 128 should be inserted into the data stream. It should be noted that any number of one or more sample of silence or zero-value data may be used as the threshold by which insertion of a dither sample into the data stream is triggered.

Dither sample generation logic 112 is configured to generate a dither sample for insertion into the data stream in response to the determination by monitoring logic 110 that the data stream indicates inactivity. Dither sample generation logic 112 is also configured to provide the generated dither sample to insertion logic 114 via line(s) 128. In embodiments, the dither sample generated by dither sample generation logic 112 has a negative value. Dither sample generation logic 112 may dynamically generate the dither sample based on the configured dither sample value. In an alternative embodiment, dither sample generation logic 112 may store a plurality of dither sample values in a memory from which a given dither sample value may be selected based upon the configured value. In some embodiments, a negative value in the range from negative '1h' (a value of −1 in hexadecimal) to negative '40h' (a value of −40 in hexadecimal) may be generated or retrieved for insertion into the data stream. In these embodiments, this range of dither sample values may allow for a functional dither sample that does not produce noise when inserted into the data stream. For instance, a dither sample value of '−1h' in a two's complement representation for a 24-bit resolution data stream is: FFFFFFh.

Insertion logic 114 is configured to insert the dither sample into the data stream. In embodiments, the dither sample may be inserted into every frame, every other frame, or into any number of frames at a frequency set by configuration logic 106. As shown in FIG. 1B, insertion logic 114 receives data inputs from audio input circuit 108 on line(s) 124 (the data stream from audio data source 104) and from dither sample generation logic 112 on line(s) 128 (the generated dither sample). Insertion logic 114 receives a control input from monitoring logic 110 on line(s) 126. Based on the control input received, insertion logic 114 is configured to output the data stream from audio data source 104 or the generated dither sample described above. For instance, when monitoring logic 110 determines that a data sample contains non-zero data or non-silence in the data stream from audio data source 104 (the data stream indicates activity), monitoring logic 110 may provide a control input to insertion logic 114 causing insertion logic 114 to output the data stream from audio data source 104. However, when monitoring logic 110 determines that a threshold number of data samples of silence or zero-value data have been observed in the data stream from audio data source 104 (i.e., the data stream indicates inactivity), monitoring logic 110 may provide a control input to insertion logic 114 causing insertion logic 114 to output the generated dither sample as a portion of the data stream instead of the portion of the data stream from audio data source 104 that indicated inactivity.

In embodiments, insertion logic 114 may comprise logic components such as, without limitation, one or more multiplexors, field effect transistors (FETs), combinatorial logic, custom designed/programmed integrated circuits, and/or the like.

Audio formatting logic 116 may be configured to arrange the data stream (as originally provided from audio data source 104 and/or including an inserted dither sample generated by dither sample generation logic 112) into an appropriate format for transmission from dither sample insertion logic 100. For instance, ordering of data, packetizing, addition of headers and/or fields in the data, and/or the like may be performed by audio formatting logic 116. In some embodiments, audio formatting logic 116 may alter the format of the data in the processed data stream to be in a one's complement format or a two's complement format.

Transmitting logic 118 is configured to transmit the processed data stream (e.g., processed data stream 148 of FIG. 1A) from dither sample insertion logic 100 on line(s) 134 (e.g., as transmitted data stream 152 of FIG. 1A). In embodiments, transmitting logic 118 may transmit the processed data stream to a receiver, such as, but without limitation a networking device, a television, a computer or computing device, a home theater device, and/or the like. As described herein, the processed data stream may be transmitted by transmitting logic 118 at one or more bit resolutions (e.g., 16-bit, 20-bit, 24-bit, etc.) and in a one's complement or a two's complement format. Transmitting logic 118 may include one or more buffers, inverters, FETs, and/or other components for transmitting the data stream as would be understood by persons skilled in the relevant art(s) having the benefit of this disclosure. In some embodiments, transmitting logic 118 may transmit a data stream wirelessly or along a wired connection (i.e., line(s) 134 as shown in FIG. 1B may represent one or more wired and/or wireless connections to one or more audio receivers).

In embodiments, one or more of the components of dither sample insertion logic 100 described herein may be implemented in a processor or processing device, such as, but not limited to, a digital signal processor (DSP), custom and/or programmable integrated circuits (e.g., an ASIC (application specific integrated circuit), FPGA (field programmable gate array), etc.), a SOC (system on chip), one or more computer processors (e.g., CPUs, CPU cores, microprocessors, microcontrollers, etc.), and/or the like. Additionally, components such as transmitter 102, audio data source 104, and/or configuration logic 106 may be part of the same device or apparatus, or may be parts of different devices within a system. Additionally, while components such as monitoring logic 110, dither sample generation logic 112, and insertion logic 114 are shown as being included within transmitter 102, one or more of these components may reside separately from, or in a processor/processing device (e.g., signal processor 140 of FIG. 1A), as described herein, in or outside of, transmitter 102, according to embodiments.

Dither sample insertion logic 100 and each of the elements/components included therein may be implemented in hardware, or a combination of hardware with software and/or firmware.

4. Further Example Embodiments and Advantages

The embodiments described herein enable the insertion of resolution-independent dither samples into data streams such as audio data streams and audio transmissions. Embodiments provided for inserting dither samples with negative values can prevent and/or eliminate synchronization loss between audio transmitters and audio receivers due to data stream inactivity and the subsequent re-synchronization that results. It is contemplated, however, that the embodiments described herein may be applicable to strategies and implementations for insertion of dither samples into data streams other than those explicitly set forth herein. For example, dither samples having any negative value may be used. This is because binary representations of relatively low valued one's compliment and two's complement negative numbers (e.g., equal to or near negative one) tend to include strings of "1"s, and when one or more of the lowest bits are truncated from these numbers, the strings of "1"s remain. For instance, a two's compliment value of negative 1 is "11111111" (shown as 8 bits). When one or more of the right most bits are truncated, such as "1111111" (one right most bit truncated) or "111111" (two right most bits truncated), the value of this binary representation is still negative 1. Thus, the value of the dither sample does not change when truncated, a power saving mode in a receiver may be avoided by the receiver receiving the dither sample, and when played by an audio player, the dither sample makes a low amplitude sound.

Similarly, various audio, electronic and computing devices may use the techniques described herein in various combinations. Likewise, information about audio receivers may be provided to audio transmitters to further configure/tailor the insertion of dither samples in accordance with the embodiments described herein. Still further, protocols other than S/PDIF and HDMI may also benefit from the techniques and embodiments as described above.

Additionally, it will be recognized by persons skilled in the relevant art(s) having the benefit of this disclosure that the techniques and embodiments described herein may be applicable to fields of endeavor other than audio transmissions in which a "keep alive" signal, such as the described dither sample, between transmitters and receivers operating at different bit resolutions is implemented.

It will also be recognized that the systems, their respective components, and/or the techniques described herein may be implemented in hardware, or hardware combined with software and/or firmware, including being implemented as hardware logic/electrical circuitry. The disclosed technologies can be put into practice using implementations of hardware or hardware combined with software and/or firmware other than those described herein. Any hardware or hardware combined with software and/or firmware implementations suitable for performing the functions described herein can be used, such as those described in the following sections.

5. Example Operational Embodiments

Embodiments are described herein that allow for inserting dither samples that are independent of data resolution into audio signals. For instance, systems and apparatuses are described above for inserting dither samples that are independent of data resolution into audio signals. These embodiments may perform their functions in various ways, including according to the ways described above, as well as according to the ways described in this Section.

Figure 2:
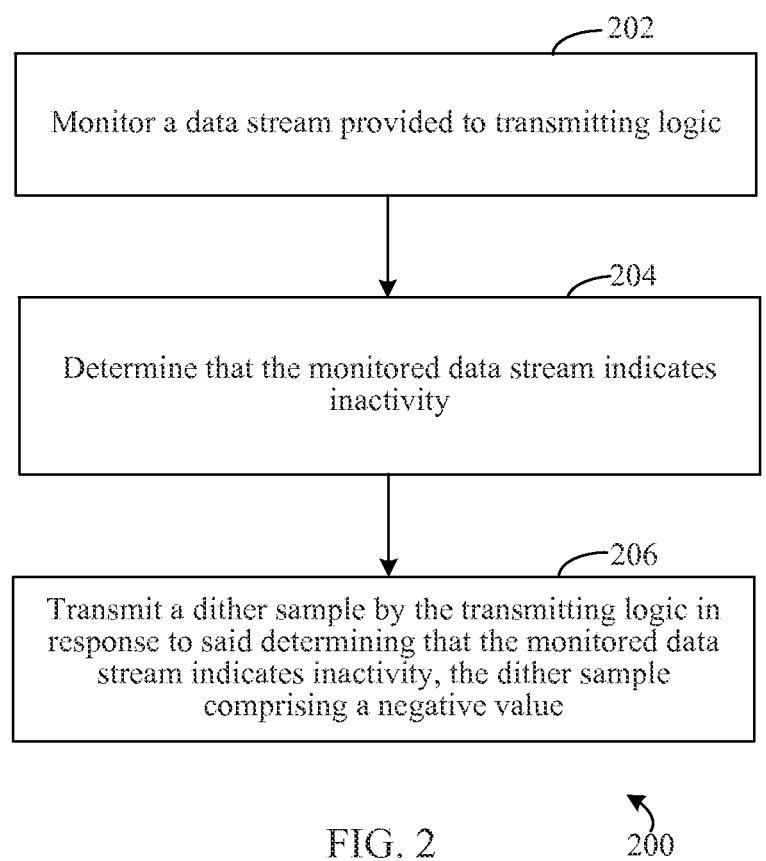
FIG. 2 shows a flowchart providing a process for inserting a dither sample into a data stream, according to an exemplary embodiment.

For instance, FIG. 2 shows a flowchart 200 providing a process for inserting dither samples that are independent of data resolution into data streams (e.g., audio signals), according to an exemplary embodiment. In embodiments, audio data transmission system 150 and dither sample insertion logic 100, and/or combinations of their components as shown in FIGS. 1A and 1B may operate according to flowchart 200. Other structural and operational embodiments will be apparent to persons skilled in the relevant art(s) based on the discussion regarding flowchart 200. Flowchart 200 is described as follows with reference to FIG. 1B for purposes of illustration.

Flowchart 200 may begin with step 202. In step 202, a data stream provided to transmitting logic is monitored. For instance, monitoring logic 110 of FIG. 1B may be configured to monitor the provided data stream. More specifically, in embodiments, a data stream from audio data source 104 that is provided to audio input circuit 108 of transmitter 102 (e.g., data stream 146 of FIG. 1A) may be monitored by monitoring logic 110, as shown in FIG. 1B.

In step 204, it is determined that the monitored data stream indicates inactivity.

For example, monitoring logic 110 of FIG. 1B may be configured to determine that data or contents (or lack thereof) in the data stream indicate inactivity of audio data being provided by an audio source (e.g., audio data source 104). Monitoring logic 110 may be configured to monitor data samples of the data stream to determine that silence or zero-value data (e.g., a value of 000000h in a 24-bit system) is present in the data stream.

In step 206, a dither sample is transmitted by transmitting logic in response to determining that the monitored data stream indicates inactivity, where the dither sample comprises a negative value. In embodiments, transmitting logic 118 of FIG. 1B is configured to transmit the dither sample. Transmitting logic 118 may be configured to transmit the dither sample in a one's complement format and/or a two's complement format, and may be configured to transmit the dither sample according to one or more data bit resolutions (e.g., 16-bit, 20-bit, 24-bit, etc.). In embodiments, transmitting logic 118 is configured to transmit a negative dither sample value, such as '−1' (e.g., FFFFFFh in 24-bit, two's complement format). Transmitting logic 118 transmits the dither sample in a data stream (e.g., transmitted data stream 152 of FIG. 1A).

In some example embodiments, one or more steps 202, 204, and/or 206 of flowchart 200 may not be performed. Moreover, steps in addition to or in lieu of steps 202, 204, and/or 206 may be performed. Further, in some example embodiments, one or more of steps 202, 204, and/or 206 may be performed out of order, in an alternate sequence, or partially (or completely) concurrently with other steps.

Figure 3:
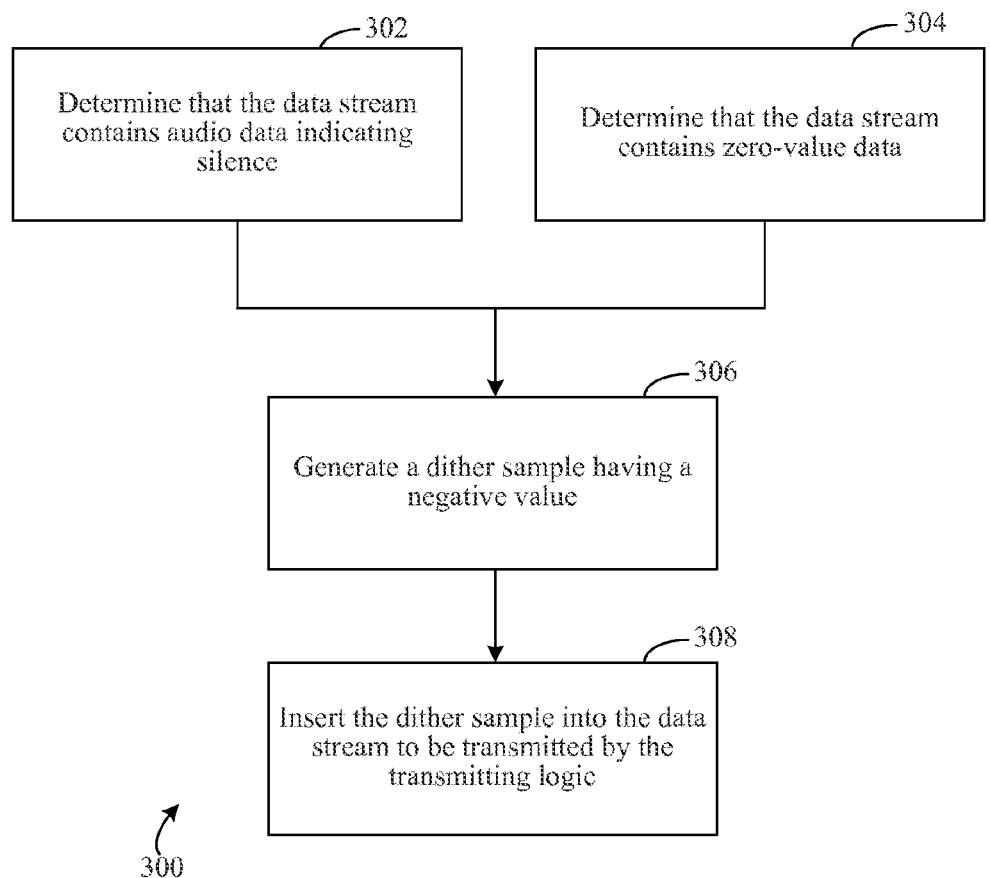
FIG. 3 shows a flowchart providing a process for generating and inserting a dither sample into a data stream, according to a further exemplary embodiment.

Turning now to FIG. 3, an exemplary flowchart 300 is depicted providing a process for generating and inserting dither samples that are independent of data resolution into data streams (e.g., audio signals/transmissions), according to embodiments. The steps of flowchart 300 may be performed in conjunction with the steps of flowchart 200 of FIG. 2 as described above. In embodiments, audio data transmission system 150 and dither sample insertion logic 100, and/or combinations of their components as shown in FIGS. 1A and 1B may operate according to flowchart 300. Other structural and operational embodiments will be apparent to persons skilled in the relevant art(s) based on the discussion regarding flowchart 300. Flowchart 300 is described as follows.

Flowchart 300 may begin with step 302 and/or step 304. Steps 302 and/or 304 may be further embodiments of step 204 of flowchart 200 shown in FIG. 2 and described above. In embodiments, one or both of steps 302 and 304 may be performed.

In step 302, it is determined that the data stream contains audio data indicating silence. In embodiments, audio data indicating silence also indicates data stream inactivity. Monitoring logic 110 of FIG. 1B may be configured to determine that the data stream contains audio data indicating silence (e.g., contains no data values for a threshold number of data samples and/or period of time, contains data indicating a zero or near zero audio amplitude for such a threshold, etc.). For example, monitoring logic 110 may monitor the data stream according to the configuration set by configuration logic 106 to determine that the data on the data stream indicates silence.

In step 304, it is determined that the data stream contains zero-value data. In embodiments, zero-value data on the data stream also indicates data stream inactivity. Monitoring logic 110 of FIG. 1B may be configured to determine that the data stream contains zero-value data. For example, monitoring logic 110 may monitor the data stream to according to the configuration set by configuration logic 106 to determine that the data on the data stream contains zero-value data.

In step 306, a dither sample having a negative value is generated. In embodiments, dither sample generation logic 112 of FIG. 1B is configured to generate the dither sample. Dither sample generation logic 112 may generate the dither sample having a negative value (e.g., from −1h to −40h) such that the insertion of the dither sample into the data stream will not produce noise at an audio receiver that receives the dither sample. Dither sample generation logic 112 may also generate the dither sample to be resolution-independent with respect to an audio receiver that receives the dither sample.

In step 308, the dither sample is inserted into the data stream to be transmitted by the transmitting logic. In embodiments, insertion logic 114 may be configured to insert the generated dither sample into the data stream. For example, as described above, dither sample generation logic 112 generates a dither sample and provides the dither sample to insertion logic 114 via line(s) 128. When monitoring logic 110 determines that the data stream indicates inactivity, monitoring logic 110 provides a data output via line(s) 126 to insertion logic 114. Based on the received data output from monitoring logic 114, insertion logic 114 inserts the generated dither sample into the data stream in place of the inactive data portion of the original data stream (e.g., the data stream received by audio input circuit 108 from audio data source 104).

In some example embodiments, one or more steps 302, 304, 306 and/or 308 of flowchart 200 may not be performed. Moreover, steps in addition to or in lieu of steps 302, 304, 306 and/or 308 may be performed. Further, in some example embodiments, one or more of steps 302, 304, 306 and/or 308 may be performed out of order, in an alternate sequence, or partially (or completely) concurrently with other steps.

6. Example Computer Embodiments

Dither sample insertion logic 100, transmitter 102, audio data source 104, configuration logic 106, audio input circuit 108, monitoring logic 110, dither sample generation logic 112, insertion logic 114, audio formatting logic 116, transmitting logic 118, signal processor 104, negative value dither sample inserter 142, flowchart 200, flowchart 300, any of their components or sub-components, and/or any further systems, sub-systems, and/or components disclosed herein may be implemented in hardware (e.g., hardware logic/electrical circuitry), or any combination of hardware with software (computer program code or instructions configured to be executed in one or more processors or processing devices) and/or firmware. Such embodiments may be commensurate with the description in this Section.

Figure 4:
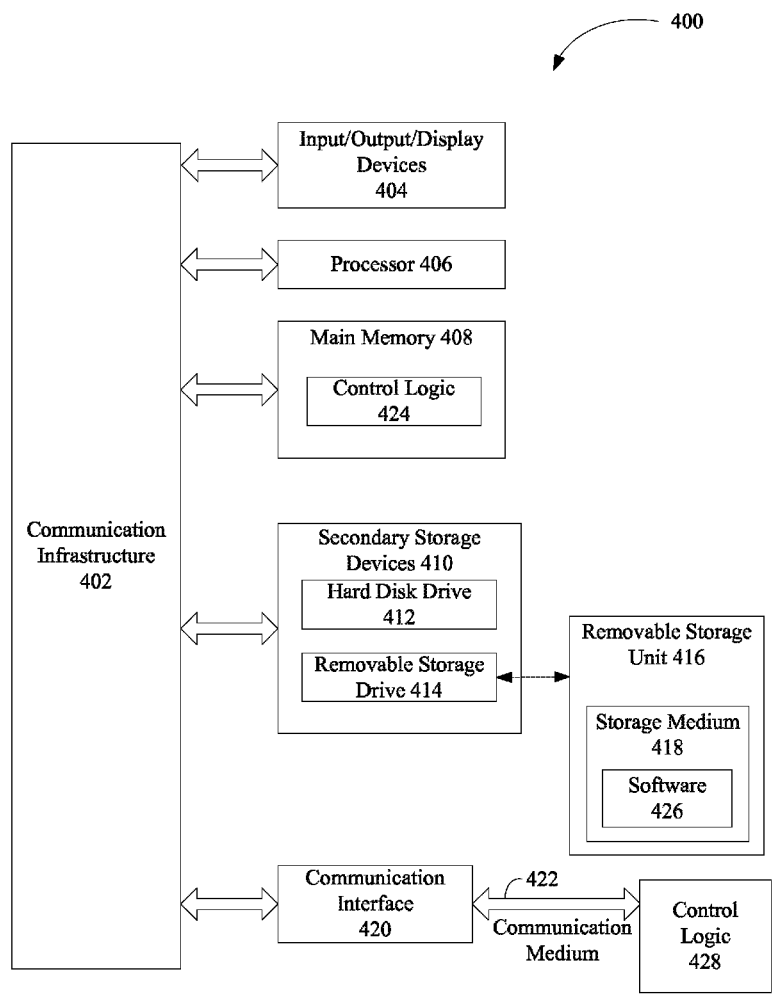
FIG. 4 shows a block diagram of a device which implement dither sample insertion logic, according to an exemplary embodiment.

The embodiments described herein, including systems, methods/processes, and/or apparatuses, may be implemented using well known processing devices, set-top boxes, televisions, interactive televisions, audio/video devices, home theater devices, servers, computers, such as a computer 400 shown in FIG. 4, and/or other devices disclosed elsewhere herein or otherwise known. It should be noted that computer 400 may represent set-top boxes (e.g., such as those including dither sample insertion logic 100), processing devices, and/or traditional computers in one or more embodiments. For example, dither sample insertion logic 100, and any of the sub-systems, components, and/or models respectively contained therein and/or associated therewith, may be implemented using one or more computers 400 and/or one or more sub-components thereof.

Computer 400 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 400 may be any type of computer, including a desktop computer, a server, etc.

Computer 400 includes one or more processors (also called central processing units, or CPUs), such as a processor 406. Processor 406 is connected to a communication infrastructure 402, such as a communication bus. In some embodiments, processor 406 can simultaneously operate multiple computing threads, and in some embodiments, one or more processors 406 may be multi-core processors.

Computer 400 also includes a primary or main memory 408, such as random access memory (RAM). Main memory 408 has stored therein control logic 424 (computer software), and data.

Computer 400 may also include one or more secondary storage devices 410. Secondary storage devices 410 include, for example, a hard disk drive 412 and/or a removable storage device or drive 414, as well as other types of storage devices, such as memory cards and memory sticks. For instance, computer 400 may include an industry standard interface, such a universal serial bus (USB) interface for interfacing with devices such as a memory stick. Removable storage drive 414 represents a floppy disk drive, a magnetic tape drive, a compact disk drive, an optical storage device, tape backup, etc.

Removable storage drive 414 interacts with a removable storage unit 416. Removable storage unit 416 includes a computer useable or readable storage medium 418 having stored therein computer software 426 (control logic) and/or data. Removable storage unit 416 represents a floppy disk, magnetic tape, compact disk, DVD, optical storage disk, or any other computer data storage device. Removable storage drive 414 reads from and/or writes to removable storage unit 416 in a well-known manner.

Computer 400 also includes input/output/display devices 404, such as touchscreens, LED and LCD displays, monitors, keyboards, pointing devices, etc.

Computer 400 further includes a communication or network interface 418. Communication interface 420 enables computer 400 to communicate with remote devices. For example, communication interface 420 allows computer 400 to communicate over communication networks or mediums 422 (representing a form of a computer useable or readable medium), such as LANs, WANs, the Internet, etc. Network interface 420 may interface with remote sites or networks via wired or wireless connections.

Control logic 428 may be transmitted to and from computer 400 via the communication medium 422.

Any apparatus or manufacture comprising a computer useable or readable medium having control logic (software) stored therein is referred to herein as a computer program product or program storage device. This includes, but is not limited to, computer 400, main memory 408, secondary storage devices 410, and removable storage unit 416. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic to implement, for example, dither sample insertion logic 100, transmitter 102, audio data source 104, configuration logic 106, audio input circuit 108, monitoring logic 110, dither sample generation logic 112, insertion logic 114, audio formatting logic 116, transmitting logic 118, signal processor 104, negative value dither sample inserter 142, flowchart 200, flowchart 300, any of their components or sub-components, and/or further embodiments described herein. Embodiments of the invention are directed to computer program products comprising such logic (e.g., in the form of program code or instructions) stored on any computer-readable/computer-useable medium. Such program code, when executed in one or more processors, causes a device to operate as described herein.

Note that such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

7. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. A method, comprising:
monitoring a data stream provided to transmitting logic;
determining that the monitored data stream indicates inactivity; and transmitting a dither sample by the transmitting logic in response to said determining that the monitored data stream indicates inactivity, the dither sample comprising a negative value.

2. The method of claim 1, further comprising:
inserting the dither sample into the data stream to be transmitted by the transmitting logic.

3. The method of claim 1, wherein the dither sample comprises a value of negative one ("−1").

4. The method of claim 1, wherein said determining that the monitored data stream indicates inactivity comprises:
determining that the data stream contains a series of zero-value data values.

5. The method of claim 1, wherein the data stream contains audio data, wherein said determining that the monitored data stream indicates inactivity comprises:
determining that the data stream contains audio data indicating silence.

6. The method of claim 1, wherein the data stream comprises data formatted in accordance with a one's complement format or a two's complement format.

7. The method of claim 1, wherein the transmission of data comprises data formatted in accordance with a 24-bit resolution.

8. An apparatus, comprising:
a signal processor configured to receive and process a data stream from an audio data source, the signal processor comprising:
monitoring logic configured to determine whether the data stream indicates activity or inactivity; and
dither sample generation logic configured to generate a dither sample for insertion into the data stream in response to determining that the data stream indicates inactivity, the dither sample comprising a negative value; and
transmitting logic configured to transmit the processed data stream from the apparatus.

9. The apparatus of claim 8, further comprising:
insertion logic configured to insert the dither sample into the data stream.

10. The apparatus of claim 8, wherein the dither sample generated by the dither sample generation logic comprises a value of negative one ("−1").

11. The apparatus of claim 8, wherein the monitoring logic is configured to determine whether the data stream indicates inactivity by determining that the data stream contains a series of zero-value data values.

12. The apparatus of claim 8, wherein the monitoring logic is configured to determine that the data stream contains audio data that indicates silence.

13. The apparatus of claim 8, wherein the data stream is received in accordance with a one's complement format or a two's complement format.

14. The apparatus of claim 8, wherein the transmitting logic is configured to transmit the processed data stream from the apparatus in accordance with a 24-bit resolution.

15. A system, comprising:
an audio data source configured to provide a data stream;
monitoring logic configured to determine whether the provided data stream indicates activity or inactivity; and
dither sample generation logic configured to generate a dither sample for insertion into the data stream in response to determining that the data stream indicates inactivity, the dither sample comprising a negative value.

16. The system of claim 15, further comprising:
transmitting logic configured to transmit the dither sample to a receiver device.

17. The system of claim 16, wherein the transmitting logic is configured to transmit the dither sample at a bit resolution that is greater than or equal to a bit resolution of the receiver device.

18. The system of claim 15, further comprising:
insertion logic configured to insert the dither sample into the data stream.

19. The system of claim 15, wherein the dither sample generation logic is configured to generate a dither sample with a value of negative one ("−1").

20. The system of claim 15, wherein the audio data source is configured to provide the data stream in accordance with a one's complement format or a two's complement format.

\* \* \* \* \*